United States Patent
Heimann et al.

(10) Patent No.: US 6,386,601 B1
(45) Date of Patent: May 14, 2002

(54) LATCHING MECHANISM

(75) Inventors: Robert L. Heimann, Stoutsville; Wayne L. Soucie, Columbia, both of MO (US)

(73) Assignee: Elisha Technologies Co LLC, Moberly, MO (US)

( * ) Notice: Subject to any disclaimer, the term of this patent is extended or adjusted under 35 U.S.C. 154(b) by 0 days.

(21) Appl. No.: 09/386,705

(22) Filed: Aug. 31, 1999

Related U.S. Application Data

(60) Provisional application No. 60/098,710, filed on Sep. 1, 1998, and provisional application No. 60/117,630, filed on Jan. 28, 1999.

(51) Int. Cl.[7] ............................................. E05B 65/00
(52) U.S. Cl. ................................ 292/256.73; 292/256.5
(58) Field of Search .......................... 292/336.3, 256.5, 292/256.67, 256.71, 256.73; 114/203; 220/324, 327, 328

(56) References Cited

U.S. PATENT DOCUMENTS

| | | | | |
|---|---|---|---|---|
| 938,593 A | * | 11/1909 | Laubeuf | 114/178 |
| 1,327,011 A | * | 1/1920 | Arndt | 292/212 |
| 1,756,185 A | * | 4/1930 | Falck | 27/17 |
| 2,283,304 A | * | 5/1942 | Williams | 292/212 |
| 2,815,253 A | * | 12/1957 | Spriggs | 308/238 |
| 3,441,328 A | * | 4/1969 | Hurley | 308/238 |
| 3,945,695 A | * | 3/1976 | Speakman | 308/240 |
| 4,020,778 A | | 5/1977 | Sutton | |
| 4,098,022 A | | 7/1978 | Hesch | |
| 4,114,424 A | | 9/1978 | Johnson | |
| 4,199,176 A | | 4/1980 | Kelly | |
| 4,308,153 A | * | 12/1981 | Mori | 252/12.2 |
| 4,438,595 A | | 3/1984 | MacDonald | |
| 4,543,746 A | | 10/1985 | Racca | |
| 4,678,348 A | * | 7/1987 | Tielemans | 384/114 |
| 4,765,632 A | * | 8/1988 | D'Alteio | 277/81 R |
| 4,796,419 A | * | 1/1989 | Braxmeier | 57/134 |
| 4,844,518 A | | 7/1989 | Pritchard | |

(List continued on next page.)

FOREIGN PATENT DOCUMENTS

| | | |
|---|---|---|
| EP | 0 334 805 B1 | 3/1989 |
| JP | 56013286 A | 7/1979 |
| JP | 57044590 A | 9/1980 |
| JP | 56013286 | 2/1981 |
| JP | 57044590 | 3/1982 |
| JP | 08028135 A | 7/1994 |
| JP | 8028135 | 1/1996 |

OTHER PUBLICATIONS

Paper No. 323 Corrosioin 99—Innovative Corrosion & Design Solutions for Watertight Door Dog Latch Systems—Bob Heimann, William Dalton, Jeff Tayon.

*Primary Examiner*—Gary Estremsky
(74) *Attorney, Agent, or Firm*—Michael K. Boyer

(57) ABSTRACT

A latching mechanism that uses lubricant impregnated bearings to improve the operation, reduce the corrosion, ease the maintenance, and extend the life of the latching mechanism. The latching mechanism comprises a spindle rotatably disposed in a sleeve that is fixed to a frame (e.g., a door frame). Positioned in the annular space between the spindle and sleeve, the lubricant impregnated bearings separate dissimilar materials and provide a constant source of lubrication. To replenish the bearings, lubricant is introduced into the annular space through a channel in the spindle that communicates between an inlet opening in the end of the spindle and an outlet opening at the annular space. The lubricant impregnated bearings are grooved to enhance lubricant flow and distribution around the bearing surfaces. A shield is attached to the spindle and is disposed around the exterior of the sleeve to prevent debris from entering the annular space. The latching mechanism is suitable for use on doors, windows, hatches, scuttles, or other openings requiring a watertight seal.

27 Claims, 3 Drawing Sheets

U.S. PATENT DOCUMENTS

| | | | | |
|---|---|---|---|---|
| 4,892,669 A | * | 1/1990 | Marcora | 252/30 |
| 5,182,963 A | * | 2/1993 | Perisho | 74/512 |
| 5,199,369 A | | 4/1993 | Meyer et al. | |
| 5,280,686 A | | 1/1994 | Davies | |
| 5,320,431 A | * | 6/1994 | Kallenberger | 384/322 |
| 5,329,869 A | | 7/1994 | Freeman et al. | |
| 5,441,005 A | | 8/1995 | Freeman et al. | |
| 5,549,068 A | | 8/1996 | Freeman et al. | |
| 5,685,648 A | * | 11/1997 | Harris | 384/291 |
| 5,848,575 A | | 12/1998 | Freeman et al. | |
| 5,913,908 A | | 6/1999 | Czipri | |
| 5,947,496 A | * | 9/1999 | Kraft | 280/93.508 |
| 6,003,461 A | | 12/1999 | Blanchette et al. | |
| 6,080,254 A | | 6/2000 | Draper et al. | |
| 6,095,365 A | * | 8/2000 | Yielding | 220/264 |
| 6,143,420 A | * | 11/2000 | Heimann | 428/453 |

\* cited by examiner

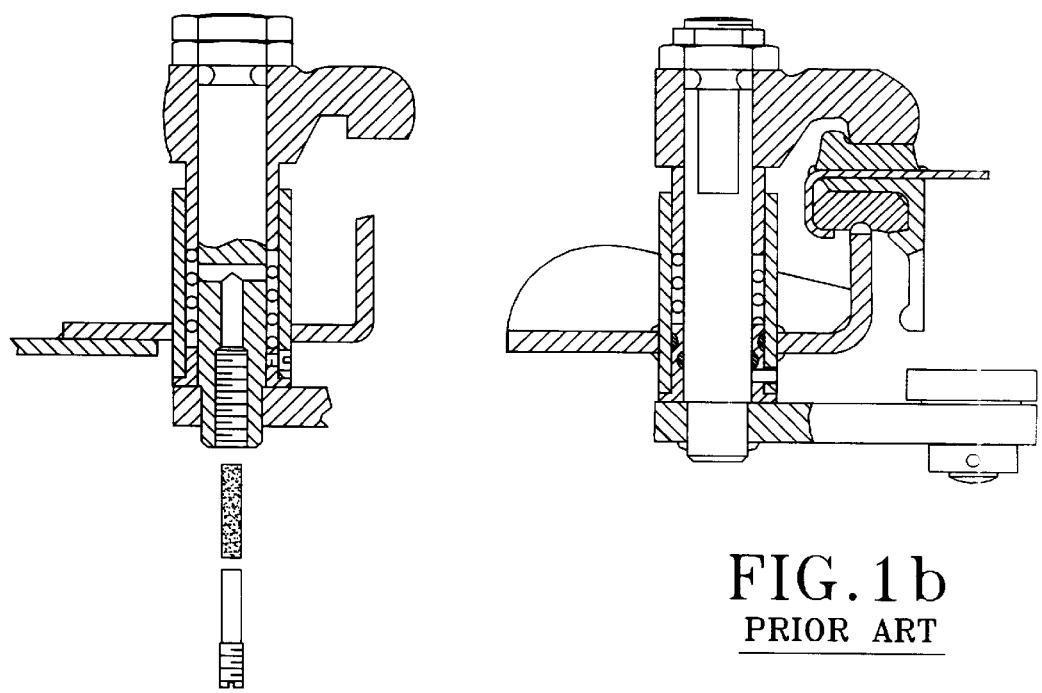
FIG. 1a PRIOR ART
FIG. 1b PRIOR ART
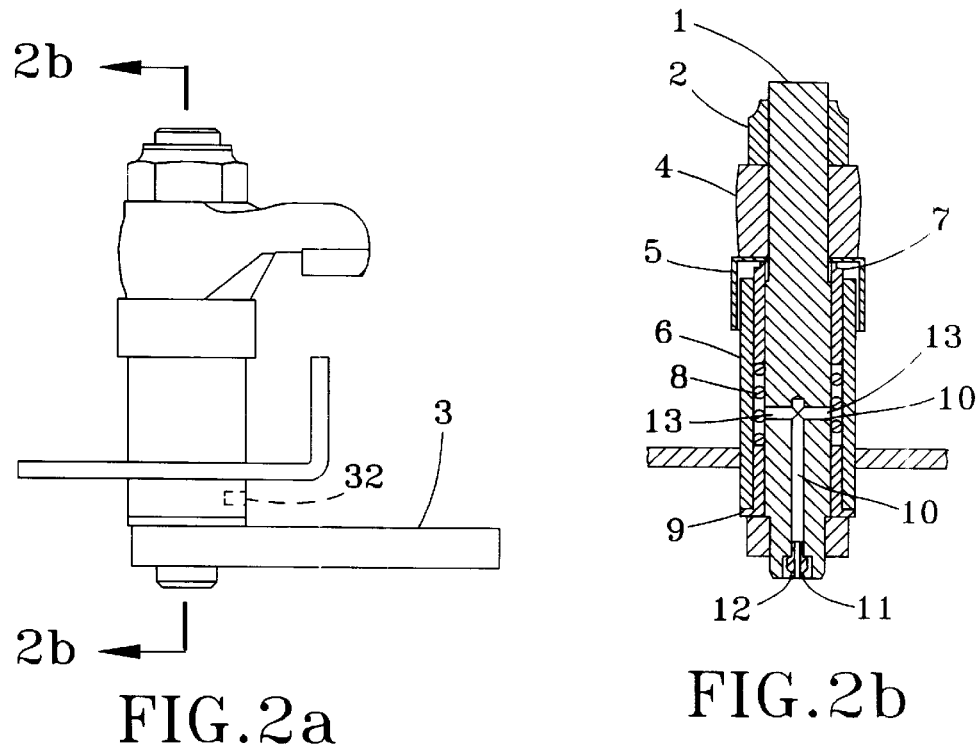
FIG. 2a
FIG. 2b

LATCHING MECHANISM

The subject matter disclosed herein claims benefit under 35 U.S.C. 119(e) of prior filed Provisional Patent Application Serial Nos. 60/098,710 and 60/117,630, filed respectively on Sep. 1, 1998 and Jan. 28, 1999. The disclosure of the previously identified patent applications is hereby incorporated by reference.

BACKGROUND

1. Field of the Invention

The present invention relates to a latching mechanism, and more particularly, to a latching mechanism that resists corrosion, simplifies routine maintenance, among other benefits.

2. Background of the Invention

Latching mechanisms used in shipboard marine applications must withstand extremely corrosive environments while maintaining watertight mechanical seals. In applications such as weatherproof deck doors, windows, hatches, and scuttles, watertight door latches (also known as dog latches) must provide a strong mechanical seal, must be operational through a wide range of temperature extremes, and must prevent the passage of water and air in heating ventilation and cooling systems. In addition, the latches must operate quickly to permit rapid opening and closing during a fire or other emergency situation.

FIGS. 1A and 1B illustrate a typical prior art latching mechanism. The main components include a sleeve, a spindle rotating within the sleeve, and a spring, string packing, and bushings positioned in the annular space between the sleeve and spindle. In some cases, the spindle has a channel through which lubricant is added. A dog lever is attached at one end of the spindle for actuating the spindle, while a dog latch is attached at the other end for engaging a door or other object. Manually pushing and turning the dog lever rotates the dog latch and either engages or releases a door or other object against an adjoining bulkhead or frame. Optionally, a suitable electromechanical actuator can operate the lever remotely and/or automatically. Another example of a conventional mechanism is disclosed in U.S. Pat. No. 4,403,779, hereby incorporated by reference.

Although the prior art latching mechanisms enable lubrication of the components within the sleeve, the components are typically non-porous, resulting in a lubrication that merely coats the bearing surfaces and is easily worn away. Further, the components themselves are typically constructed of dissimilar metals and suffer from corrosion. Thus, even with careful maintenance and periodic re-lubrication, the useful life of a prior art mechanism is limited by internal wear and corrosion.

Thus, there remains a need for a latching mechanism that separates the dissimilar metals of the components within the sleeve and uses materials that absorb lubricant to provide constant protection against wear.

SUMMARY OF THE INVENTION

The present invention is a latching mechanism that reduces wear and corrosion by using lubricant impregnated components and minimizes contact between dissimilar metals. Instead of the bushings known in the prior art, the present invention uses bearings impregnated with materials that enhance corrosion and wear protection in the annular space between the spindle and sleeve. These porous bearings absorb lubricant and provide a constant protective lubricant layer between the spindle and bearing surfaces. Further, through the use of corrosion resistant impregnating oils the effect of dissimilar metals corrosion is diminished.

In addition to the lubricant in the bearing material, the present invention provides means for adding lubricant through the spindle. Using a commercially available grease fitting, such as a zerk fitting or an Allemite™ fitting, lubricant is added at the distal end of the spindle. The lubricant passes through channels in the spindle, and fills the annular space between the sleeve and spindle. By eliminating voids and providing lubrication under pressure, the components of the latch are more effectively isolated, e.g., reducing the onset and affects of crevice corrosion. Sealed by the lubricant, the latching mechanism is pressure tight, e.g., to greater than 15 psi, and corrosion resistant without adversely impacting rotational torque.

Accordingly, an object of the present invention is to provide a latching mechanism that resists corrosion and wear while providing a tight mechanical seal.

It is another object of the present invention to maintain internal lubrication with minimal maintenance and addition of lubricant.

These and other objects of the present invention are described in greater detail in the detailed description of the invention, the appended drawings, and the attached claims.

DESCRIPTION OF THE DRAWINGS

FIGS. 1A and 1B are cross-sectional drawings of prior art latching mechanisms.

FIG. 2a is a schematic drawing of the latching mechanism of the present invention.

FIG. 2b is a cross-sectional drawing of the latching mechanism of FIG. 2a along line A—A.

DETAILED DESCRIPTION OF THE INVENTION

Figure 3A:
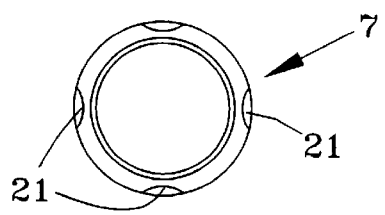
FIG. 3a is a schematic drawing of the top of the lubricant impregnated bearing shown in FIG. 2b.

Referring to FIGS. 2a and 2b, the present invention comprises a spindle 1, a lock nut 2, a dog lever 3, a dog latch 4, a shield 5, a sleeve 6, a bearing 7, a spring 8, and a flange bearing 9. Spindle 1 has a journaled cross-section and is made of any suitable high strength and corrosion resistant material, such as stainless steel. One end of spindle 1 is threaded for receiving lock nut 2, while the other end is fitted with dog lever 3. Lock nut 2 is adjacent to dog latch 4, holding dog latch 4 in a specified location on spindle 1 up against shield 5. It should be understood that the term "adjacent" as used in this specification and the claims, unless expressly stated otherwise, means two components that are in contact with each other, are next to each other with a space separating them, or are next to each other with a third component in between.

Shield 5 covers the end of sleeve 6 and prevents paint and other contaminates from entering the annular space between spindle 1 and sleeve 6. Such contaminates reduce the ease with which the dog lever 3 is operated by contributing to corrosion and increasing friction between the internal components of the latch mechanism.

Sleeve 6 is affixed to a bulkhead, frame, or other fixed object. Sleeve 6 encloses spindle 1 along the longitudinal axes of sleeve 6 and spindle 1, such that spindle 1 rotates within sleeve 6 in response to a torque applied by dog lever 3. Bearing 7 is positioned in the annular space between sleeve 6 and spindle 1. In the preferred embodiment of the present invention, bearing 7 is comprised of a powdered metal such as a porous bronze compact, and is impregnated with a corrosion resistant lubricant in accordance with conventional methods. As an example, U.S. Pat. No. 5,182,963, issued Feb. 2, 1993 to Perisho et al., discloses a lubricant impregnated material and is hereby incorporated by reference.

One end of bearing 7 is adjacent to shield 5 (within the door or bulkhead) while the other end (adjacent to the exterior of the door or bulkhead and dog lever 3) is adjacent to a spring 8. In the preferred embodiment of the present invention, spring 8 is a stainless steel compression spring. Alternatively, the compression spring can comprise a metal that is coated with a flexible polymer, e.g., a polymer carrier for corrosion-inhibiting metals such as zinc and aluminum. Spring 8 is also adjacent to flange bearing 9, which, like bearing 7, is preferably made of a lubricant impregnated powdered metal.

To replenish the lubricant impregnated bearing 7 and flange bearing 9, the present invention also provides means for adding lubricant to the annular space between spindle 1 and sleeve 6. Spindle 1 contains a channel 10 that communicates between an inlet 12 in the end of spindle 1 associated with the dog lever 3 and outlets 13 in the midsection of spindle 1 at the annular space. Channel 10 carries lubricant into the mechanism, filling the annular space and coating spring 8, bearing 7, and flange bearing 9.

At inlet 12, spindle 1 contains a means for introducing lubricant 11 into spindle 1. In the preferred embodiment of the present invention, means for introducing lubricant 11 comprises a grease zerk that is counter-bored into the end of spindle 1. Counter-boring the grease zerk prevents the grease fitting from becoming a hazardous projection on the manually operated dog lever 3. Alternatively, the grease zerk can be removed after adding lubricant and replaced with a plug, e.g., stainless steel plug.

Figure 3B:
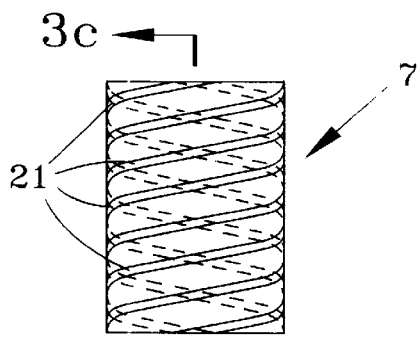
FIG. 3b is a schematic drawing of a side of the lubricant impregnated bearing shown in FIG. 2b.
Figure 3C:
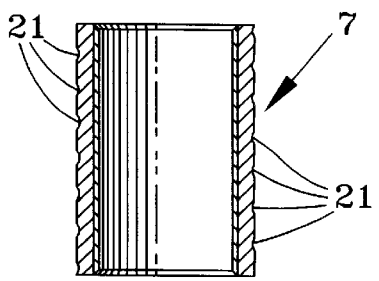
FIG. 3c is a cross-sectional drawing of the lubricant impregnated bearing of FIG. 3b along line A—A.

FIGS. 3a, 3b, and 3c illustrate a top, side, and sectional view of bearing 7. Bearing 7 is preferably made from a powdered metal such as powdered bronze compact, in accordance with conventional manufacturing techniques. In a preferred embodiment of the present invention, bearing 7 includes one or more grooves 21 along the exterior surface of the bearing, as shown on FIG. 3a extending longitudinally from end to end of bearing 7. Although not required, grooves 21 enhance lubricant flow and distribution along the bearing surface, thereby permitting the lubricant to contact and protect a greater portion of the internal bearing surfaces of the mechanism. Optionally, grooves 21 can be located on the interior surface of bearing 7. In addition, while any suitable groove configuration can be employed in one embodiment of the invention, grooves 21 are configured in a spiral, as shown on FIG. 3b, to improve distribution of the lubricant.

Figure 4A:
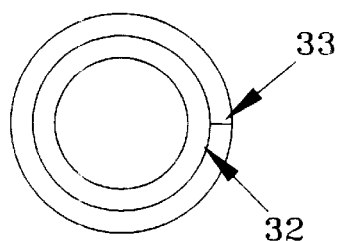
FIG. 4a is a schematic drawing of the top of the lubricant impregnated flange bearing shown FIG. 2b.
Figure 4B:
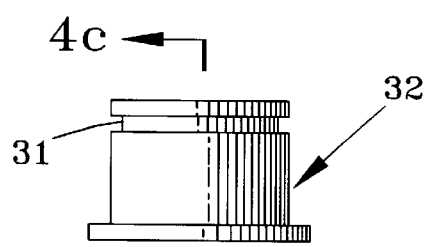
FIG. 4b is a schematic drawing of a side of the lubricant impregnated flange bearing shown in FIG. 2b.
Figure 4C:
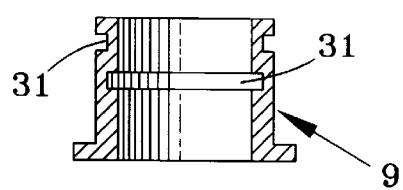
FIG. 4c is a cross-sectional drawing of the lubricant impregnated flange bearing of FIG. 4b along line A—A.

FIGS. 4a, 4b, and 4c illustrate a top, side, and sectional view of flange bearing 9. In the preferred embodiment, flange bearing 9 is fabricated from a powdered metal, such as powdered bronze, in accordance with conventional manufacturing techniques. Flange bearing 9 includes grooves 31 for receiving conventional shaft and sleeve seals, e.g., O-rings, among other conventional seals. The upper exterior groove accepts an O-ring about the exterior diameter surface of the flange and provides a seal between sleeve 6 and flange bearing 9. The lower interior groove accepts an O-ring within the interior diameter surface of the flange and provides a seal between spindle 1 and flange bearing 9. Flange bearing 9 also includes opening 32 for a set screw (not shown). The set screw affixes flange bearing 9 to sleeve 6. Consequently, flange bearing 9 and sleeve 6 remain stationary, while spindle 1 rotates within flange bearing 9 and sleeve 6 in response to torque applied to spindle 1 via dog fever 3.

The invention also includes provisions for simplifying assembly. Specifically, the invention includes provisions that ease the installation of flange bearing 9 into sleeve 6 by providing an indicator. Any suitable indicator may be used. However, preferably flange bearing 9 includes an alignment mark 33 on the face of its flange, as shown in FIG. 4a. In the preferred embodiment, alignment mark 33 is a V-groove that marks the centerline of opening 32 when viewing the face of flange. During assembly of the latch mechanism, when flange bearing 9 is inserted into sleeve 6, alignment mark 33 is aligned with the centerline of a set screw (not shown) protruding from opening 32 in sleeve 6, such that opening 32 in sleeve 6 and flange bearing 9 is lined up.

Figure 5A:
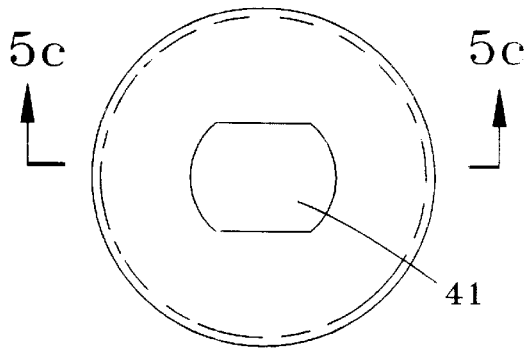
FIG. 5a is a schematic drawing of the top of the shield shown in FIG. 2b.
Figure 5B:
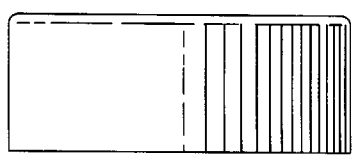
FIG. 5b is a schematic drawing of a side of the shield shown in FIG. 2b.
Figure 5C:
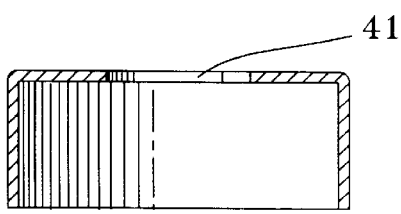
FIG. 5c is a cross-sectional drawing of the shield of FIG. 5b along line A—A.

FIGS. 5a, 5b, and 5c illustrate a top, side, and sectional view of shield 5. In the preferred embodiment of the present invention, shield 5 is made of a metallic or non-metallic material, e.g., thermoplastic, thermoset, or stainless steel. The interior dimension of shield 5 is slightly larger than the diameter of spindle 1, e.g., preferably the clearance between shield 5 and spindle 1 is about ⅛ to 1/16 inch. As shown in FIG. 5a, the interior shape 41 matches the non-circular cross-section of spindle 1, causing shield S to rotate with spindle 1. Preferably, the non-circular cross-section is a circle with flat portions formed on opposite sides of the spindle as shown in FIG. 5a. As an option, interior shape 41 and the corresponding cross-section of spindle 1 could be circular, using a friction or interference fit to maintain contact.

With regard to the lubricant, while any suitable material can be employed for imparting corrosion resistance to the mechanism, examples of preferred materials are disclosed in U.S. Pat. Nos. 5,714,093 and 5,871,668, U.S. patent application Ser. No. 09/016,461, now U.S. Pat. No. 6,010,984, and copending and commonly assigned U.S. patent application Ser. Nos. 09/130,790 and 09/370,346, each of which is incorporated by reference, herein. An example of a suitable lubricant comprises polyalphaolefin oil and sodium and/or calcium silicate having a particle size of less than about 200 mesh (supplied commercially by Elisha Products LLC, Moberly, Mo., USA as EDC™ 1270, 1700 AND 2400). Another example of a suitable lubricant comprises polybutene oil, linseed oil, fumed silica and calcium silicate. A corrosion resistant material that can be employed with the latching mechanism comprises polybutene oil, epoxy and calcium silicate.

Moreover, in another preferred embodiment, the lubricant interacts with a portion of the mechanism to form a relatively thin mineral layer. The mineral layer imparts improved corrosion resistance and other desirable properties. The mineral layer comprises an amorphous phase embedding crystallites of a complex metal silicate, and is normally 50 to 1,000 angstroms in thickness. A more detailed description of a mineral layer is disclosed in U.S. Pat. Nos. 5,928,796 and 5,938,976, and copending and commonly assigned U.S. patent application Ser. No. 09/016,853, each of which is incorporated by reference, herein.

While the above description places emphasis upon door latching mechanisms, the inventive latch can be employed in a wide variety of end uses. Examples of such end-uses include marine air/water tight doors, scuttles, hatches, offshore drilling platforms, among other uses wherein at least a portion of the latching mechanism is exposed to an environment that causes deterioration of the mechanism.

The following example is provided to illustrate the corrosion resistance of the present invention. Although the example describes certain embodiments of the present invention, it is not to be construed as limiting the invention in any way.

EXAMPLE

The corrosion resistance of the latch illustrated in FIGS. 2a, 2b, and 2c was tested by using a cyclic exposure method. Cyclic exposure measures the effects of corrosion by measuring the force required to operate the latch mechanism and whether or not the mechanism returned to its initial position after being operated. The latch illustrated in FIGS. 2a, 2b, and 2c was lubricated with a composition comprising polyalphaolefin oil (57.8 wt. %), lanolin (16.2 wt. %), fumed silica (7.0 wt. %), lithium stearate (5.5 wt. %), micronized polyethylene (2.7 wt. %), sodium and/or calcium silicate (2.7 wt. %) and epoxy resin (8.1 wt. %). This composition is described in greater detail in the aforementioned U.S. patent application Ser. No. 09/130,790, now U.S. Pat. No. 6,010,985, and U.S. patent application Ser. No. 09/370,346. The cyclic exposure performance of the latch in FIGS. 2a, 2b, and 2c (Plot A) was compared to the performance of the three conventional designs. The first conventional design was the mechanism illustrated in FIG. 1A lubricated with silicone oil and sealed with a wax (Plot D). The second conventional design was the mechanism illustrated in FIG. 2 lubricated with the above composition (Plot C). The third conventional design comprised that illustrated in FIG. 1B, 1 inch bore, quick acting, flange bearing for watertight doors, lubricated with the above composition (Plot B).

The cyclic test exposure included the following stages: (1) immersion in 5% weight sodium chloride solution for 15 minutes; (2) ambient dry-off for 75 minutes; and, (3) condensing humidity exposure for 22.5 hours. The humidity cabinet conformed to the requirements of ASTM-D2247 with the exception that the condensing temperature was maintained at 120° F. Each test cycle required 24 hours; however, on days when the stages were not completed, samples remained in humidity and the cycle was not counted. Each sample had its own immersion tank and all immersion tanks were the same size and filled with the same volume of salt solution. Evaporative losses were compensated for by the addition of deionized water.

Full Displacement Force (FIG. 6) and Breakaway Force (FIG. 7) tests were performed on the samples at interval cycles, depending on availability of a 100 pound, hand-held, digital force gauge. The samples were placed in a vice, positioned with the dog lever end of the latch facing the operator performing the test. The gauge was placed in the middle of the threaded end where the force was applied until a first movement occurred (thereby defining the breakaway force). The peak reading was then taken. After the lever returned to the original position, two more readings were taken. The average of the three readings was recorded as the breakaway force. The full displacement force test was performed in the same manner, except that the force was applied until the dog lever was pushed to its maximum travel. If at any time the dog lever failed to return to its original position, the sample was considered a failure.

Figure 6:
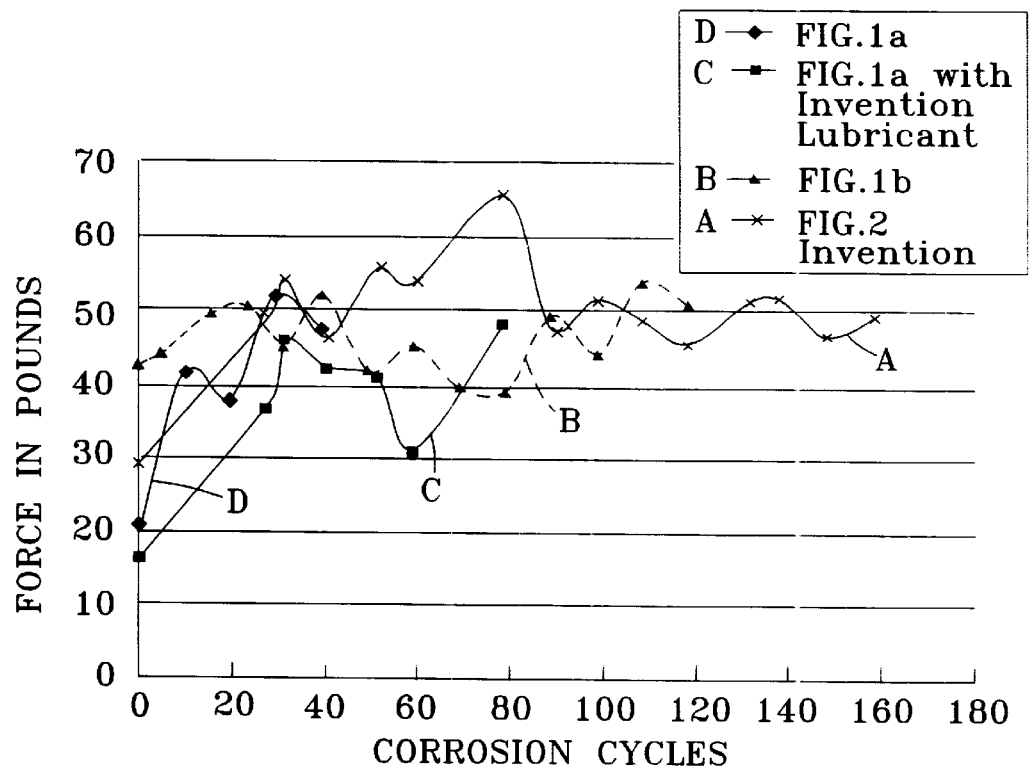
FIG. 6 is a graph of a cyclic corrosion test, plotting number of cycles against full displacement force.
Figure 7:
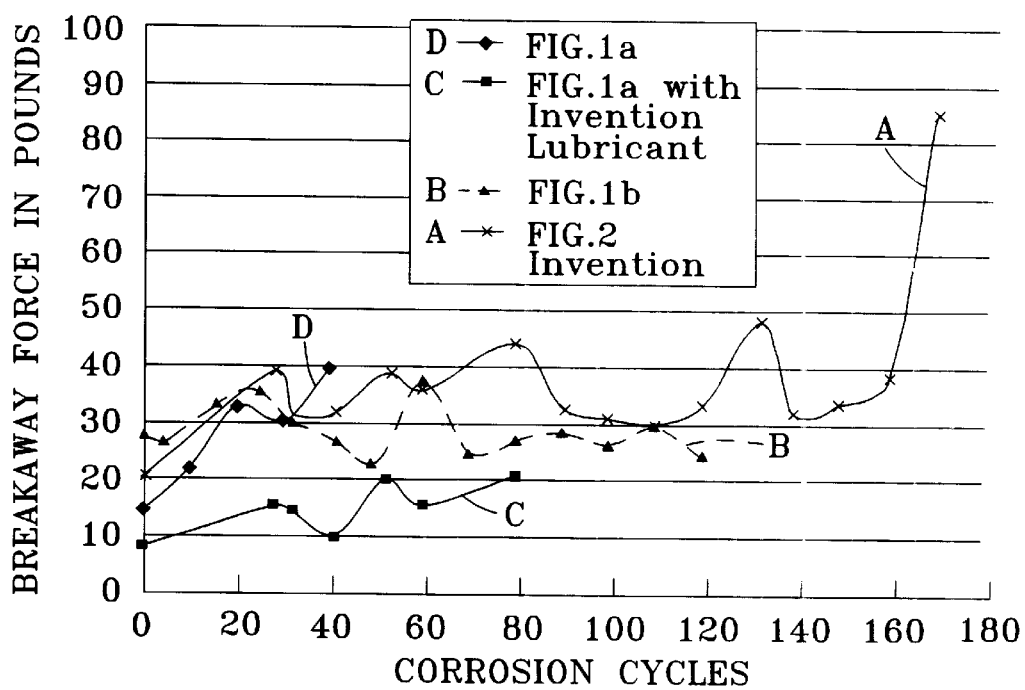
FIG. 7 is a graph of a cyclic corrosion test, plotting number of cycles against breakaway force.

Referring now to FIGS. 6 and 7, each plot illustrates force in pounds in relation to the number of corrosion cycles to which the mechanism was subjected. For both full displacement force (FIG. 6) and breakaway force (FIG. 7), Plot A shows that the present invention outperformed the conventional designs (Plot B, C, and D) in terms of number of cycles. In addition, the force curves for Plot A appear to level off as compared to Plot C and Plot D, where the force steadily increases up to mechanism failure. In summary, the present invention resisted corrosion better than the conventional designs and provided a longer service life.

The foregoing disclosure of embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

What is claimed is:

1. A latching mechanism comprising:
    (a) a sleeve;
    (b) a spindle rotatbly disposed within the sleeve wherein a shield is attached to one end of the spindle and rotates with the spindle; and
    (c) at least one lubricant impregnated bearing disposed around the spindle and within the sleeve and wherein said bearing defines at least one groove for distributing lubricant.

2. The latching mechanism of claim 1, wherein the at least one lubricant impregnated bearing is made of a powdered metal.

3. The latching mechanism of claim 2, wherein the powdered metal is porous bronze compact.

4. The latching mechanism of claim 1, wherein the at least one lubricant impregnated nearing is impregnated with a lubricant comprising at least one synthetic oil.

5. The latching mechanism of claim 4, wherein the lubricant comprises a combination wherein said at least one synthetic oil comprises polyalphaolefin oil and said combination further comprises at least one of sodium and calcium silicate.

6. The latching mechanism of claim 4, wherein the lubricant forms a mineral layer.

7. A latching mechanism comprising:
    (a) a sleeve adapted to be received within a frame;
    (b) a spindle having first and second end portions and rotably disposed within the sleeve, wherein the spindle is associated with a lever and a latch, and wherein an annular space separates the spindle and rotates with the spindle and covers the annular space and extends at least partially along an exterior surface of the sleeve;

(c) a first bearing rotatably disposed in the annular space at the first end portion of the spindle;

(d) a spring adjacent to the first bearing and disposed in the annular space; and (e) a second bearing disposed in the annular space at the second end portion of the spindle and fixed to the sleeve.

8. The latching mechanism of claim 7, wherein the second bearing contains at least one groove to distribute lubricant.

9. The latching mechanism of claim 7, wherein the spindle comprises a channel having an inlet and an outlet, the outlet being in flow communication with the annular space, so that a lubricant can be added to the first bearing.

10. The latching mechanism of claim 7, wherein the first bearing has at least one groove through which to distribute lubricant.

11. A door latching mechanism comprising:

(a) a spindle having a threaded portion, a non-circular portion adjacent to the threaded portion, a cylindrical portion adjacent to the non-circular portion, a lever portion adjacent to the cylindrical portion, and a channel that communicates between an inlet in the lever portion and an outlet in the cylindrical portion;

(b) a latch mounted on the non-circular portion of the spindle and rotating with the spindle;

(c) a shield mounted on the non-circular portion of the spindle, the shield having a planar portion and a circular portion, and said shield rotating with the spindle;

(d) a first bearing adjacent to the non-circular portion;

(e) a spring disposed around the cylindrical portion of the spindle and adjacent to the first bearing on a side of the first bearing opposite the shield;

(f) a second bearing disposed around the cylindrical portion of the spindle adjacent to the spring on a side of the spring opposite the first bearing;

(g) a sleeve disposed around the first bearing, the spring, the second bearing, and the spindle, and disposed inside the circular portion of the shield;

(h) a lever connected to the lever portion, the lever rotating with the spindle; and (i) a lubricating port disposed proximate to the inlet of the lever portion.

12. The door latching mechanism of claim 11, wherein the lubricating port comprises a grease fitting.

13. The door latching mechanism of claim 11, wherein the inlet is covered with a plug.

14. The door latching mechanism of claim 11, wherein the first bearing and the second bearing contain one or more grooves.

15. The door latching mechanism of claim 14, wherein the grooves are longitudinally disposed on the first bearing.

16. The door latching mechanism of claim 14, wherein the grooves are spirally disposed on the first bearing.

17. The door latching mechanism of claim 14, wherein a lubricant contacts the spindle, the spring, the first bearing, and the second bearing.

18. The door latching mechanism of claim 17, wherein the corrosion resistant material comprises polyalphaolefin oil and sodium and calcium silicate.

19. The door latching mechanism of claim 17, wherein the corrosion resistant material comprises a mineral layer.

20. The door latching mechanism of claim 11, wherein the first bearing and the second bearing are impregnated with a corrosion resistant lubricant comprising at least one synthetic base oil and at least one silicate.

21. The door latching mechanism of claim 11, wherein the first bearing and the second bearing are made of a powdered metal.

22. The door latching mechanism of claim 11, wherein the second bearing has a flange having a size and a shape equal to a longitudinal face of the sleeve.

23. The door latching mechanism of claim 11, wherein the second bearing comprises:

(i) an exterior groove;

(ii) an interior groove;

(iii) a first O-ring set in the exterior groove;

(iv) a second O-ring set in the interior groove; and (v) a threaded opening to receive a set screw threaded through an opening in the sleeve, said set screw affixing the second bearing to the sleeve.

24. The door latching mechanism of claim 23, wherein the flange has a indicator that locates the threaded opening in the second bearing.

25. The door latching mechanism of claim 11, wherein the shield comprises at least one member selected from the group consisting of at least one thermoplastic, at least one thermoset, or stainless steel.

26. The door latching mechanism of claim 11, wherein the inlet is in flow communication with the channel, the channel being in flow communication with the spindle, the spring, the first bearing, and the second bearing.

27. A latching mechanism comprising:

a) a spindle having a threaded portion, a non-circular portion adjacent to the threaded portion, a cylindrical portion adjacent to the non-circular portion, a lever portion adjacent to the cylindrical portion, and a channel that communicates between an inlet in the lever portion and an outlet in the cylindrical portion;

b) a latch mounted on the non-circular portion of the spindle and rotating with the spindle;

c) a shield mounted on the non-circular portion of the spindle, the shield having a planar portion and a circular portion, and said shield rotating with the spindle;

d) a first bearing adjacent to the non-circular portion;

e) a spring disposed around the cylindrical portion of the spindle and adjacent to the first bearing on a side of the first bearing opposite the shield;

f) a second bearing disposed around the cylindrical portion of the spindle adjacent to the spring on a side of the spring opposite the first bearing wherein the second bearing comprises:

(i) an exterior groove;

(ii) an interior groove;

(iii) a first O-ring set in the exterior groove;

(iv) a second O-ring set in the interior groove; and g) a threaded opening to receive a set screw threaded through an opening in the sleeve, said set screw affixing the second bearing to the sleeve, h) a sleeve disposed around the first bearing, the spring, the second bearing, and the spindle, and disposed inside the circular portion of the shield;

i) a lever connected to the lever portion, the lever rotating with the spindle; and j) a lubricating port disposed proximate to the inlet of the lever portion.

* * * * *